United States Patent [19]
McGrail et al.

[11] Patent Number: 6,013,730
[45] Date of Patent: *Jan. 11, 2000

[54] AT LEAST TRIFUNCTIONAL EPOXY RESIN REACTED WITH SOLID RUBBER MIXED WITH EPOXY RESIN AND CURING AGENT

[75] Inventors: Patrick T. McGrail; Stephen D. Jenkins; Jeffrey T. Carter, all of Cleveland, United Kingdom; Peter R. Ciriscioli, Phoenix, Ariz.; Scott D. Lucas, Scottsdale, Ariz.; Robin K. Maskell, Chandler, Ariz.

[73] Assignee: Fiberite, Inc., Tempe, Ariz.

[ * ] Notice: This patent is subject to a terminal disclaimer.

[21] Appl. No.: 08/750,394

[22] PCT Filed: Jun. 6, 1995

[86] PCT No.: PCT/GB95/01303

§ 371 Date: Jul. 28, 1997

§ 102(e) Date: Jul. 28, 1997

[87] PCT Pub. No.: WO95/33785

PCT Pub. Date: Dec. 14, 1995

[30] Foreign Application Priority Data

Jun. 7, 1994 [GB] United Kingdom ................... 9411367

[51] Int. Cl.[7] .............................. C08L 9/02; C08L 63/00; C08L 63/02; B32B 27/04
[52] U.S. Cl. .......................... 525/113; 523/428; 525/119; 428/290; 428/413; 428/417
[58] Field of Search ..................................... 525/113, 119; 523/428; 428/290, 413, 417

[56] References Cited

U.S. PATENT DOCUMENTS 4,500,660  2/1985  Minamisawa et al. ................. 523/428
4,550,129  10/1985  Nir et al. ................................ 523/423

FOREIGN PATENT DOCUMENTS 356946  7/1990  European Pat. Off. .

*Primary Examiner*—Robert E. Sellers
*Attorney, Agent, or Firm*—Gray, Cary, Ware & Freidenrich, LLP; David F. Kleinsmith; Stephen E. Reiter

[57] ABSTRACT

A curable composition and a method of making it comprises reacting in the presence of a catalyst epoxy resin(s) having at least 0.05% by weight of epoxy resin oligomer with a solid rubber which is swellable or soluble in the reaction mixture and possessing at least 1% by weight of reactive groups, in a rubber:epoxy resin(s) weight ratio of between 1:1 and 1:20, wherein said epoxy resin(s) comprises (a) at least one epoxy resin having an epoxy functionality of greater than three and (b) at least one second epoxy resin having a functionality of greater than one but not more than three; heating to effect the reaction, cooling to substantially ambient temperature, and adding any remaining portion of epoxy resin and curing agent(s).

27 Claims, 4 Drawing Sheets

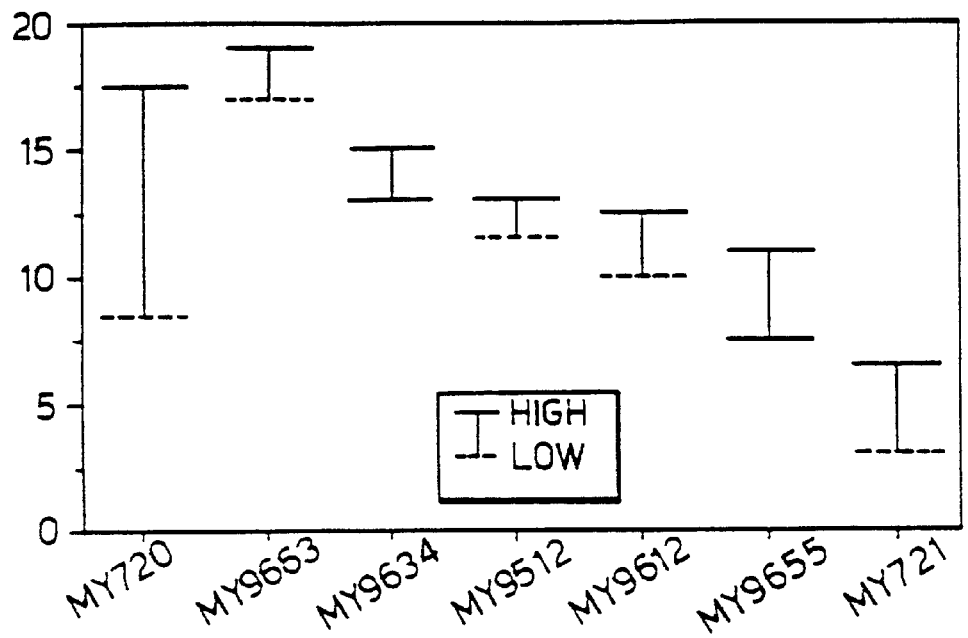
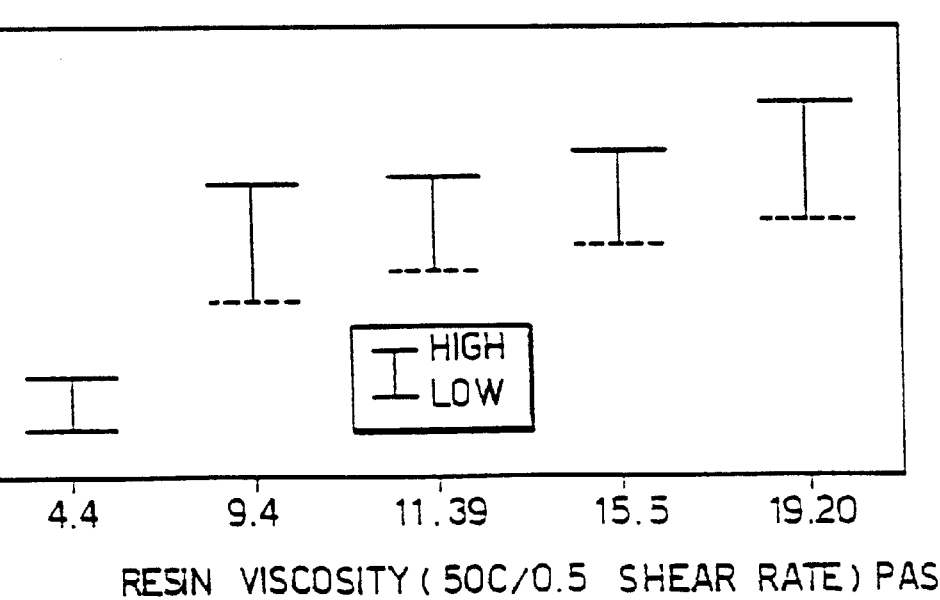

AT LEAST TRIFUNCTIONAL EPOXY RESIN REACTED WITH SOLID RUBBER MIXED WITH EPOXY RESIN AND CURING AGENT

This invention relates to curable compositions.

The use of curable compositions such as epoxy, cyanate, phenolic and like resins, both reinforced and unreinforced, has been known for a long time in a wide variety of commercial and military applications. Of particular importance is the use of such resins reinforced with continuous fibres, both unidirectional and woven, for structural applications such as aerospace vehicle parts such as aircraft tail assemblies and wing structures. Many such applications involve the use of multifunctional epoxy resins such as tetraglycidyl compounds cured using diamine hardeners.

However, whilst composite materials made from these resins have a relatively high modulus and Tg, they are usually brittle. A number of approaches have been used to improve the mechanical properties of the resin systems both in the bulk resin system and in the interlaminar regions in laminated fibre-reinforced composite materials. Typically, to improve toughness, for example, these include the addition of rubbers, thermoplastics, particulate fillers, interlaminar tougheners etc, often in combination.

Examples of toughened resin systems are to be found in U.S. Pat. No. 4,482,660, U.S. Pat. No. 4,500,660, U.S. Pat. No. 4,680,076, U.S. Pat. No. 4,783,506, U.S. Pat. No. 4,863,787, U.S. Pat. No. 4,977,215, U.S. Pat. No. 4,977,218, EP-A-71197 and EP-A-559437. Brief details of the disclosures of these documents is given below.

U.S. Pat. No. 4,482,660 and U.S. Pat. No. 4,500,660 both disclose epoxy resin systems which are derived from epoxy resins, a reaction product of an epoxy resin and a butadiene/acrylonitrile copolymer having carboxylic groups and a curing agent such as dicyandiamide or 4,4-diaminodipnenylsulphone. Whilst there are no specific details disclosed, both documents suggest that using a reaction product of an epoxy resin and a solid rubber does not give rise to useful properties either in the curable composition or in the cured articles made therefrom. It is suggested that the viscosity of the curable composition can be adjusted by the addition of solid rubber particles, eg nitrile rubbers having carboxylic groups, thereto.

U.S. Pat. No. 4,680,076 discloses a tough cured resin system having a phase-inverted morphology derived from a polyepoxy resin, an aromatic oligomer (ie thermoplastic), an aromatic diamine hardener and a reactive liquid rubber.

U.S. Pat. No. 4,783,506 and U.S. Pat. No. 4,863,787 disclose a curable composition based on a polyepoxy resin, an aromatic oligomer, a diamine hardener for the epoxy resin and a reactive (eg carboxyl functionality) solid rubber, the latter being present as infusible particles having a median size between 10 $\mu$ and 75 $\mu$. The conversion of the rubber into infusible particles is preferably achieved in situ by removing solvent from the epoxy/oligomer/rubber mixture whilst heating it. In using the composition to form fibre-reinforced composite materials, a large proportion of the particles are filtered by the fibres and remain on the prepreg surface to act as interlaminar toughening agents. Alternatively, the particles, presumably preformed, may be applied directly to the surface of the prepregs.

U.S. Pat. No. 4,977,215 and U.S. Pat. No. 4,977,218 disclose similar resin systems to U.S. Pat. No. 4,783,506 and U.S. Pat. No. 4,863,787 but in which the infusible rubber particles are preformed, have a Tg above 15° C., a size in the range 1 to 75 $\mu$ and comprise cross-linked carboxylated diene rubbers or carboxylated acrylic rubbers. Again, in using the composition to form fibre-reinforced composite materials, a large proportion, if not all, of the particles remain on the prepreg surface to act as interlaminar toughening agents.

EP-A-71197 is primarily concerned with novel diamine hardeners for curable compositions but again discloses the use of what is termed flexibilizing agents or elastomeric compounds such as rubbers and thermoplastics.

EP-A-559437 is concerned with a particular problem arising when fabricating honeycomb reinforcing structures which are covered with resin-impregnated fabrics; that is porosity in the fabrics which it solves by crushing the impregnated fabric to achieve a certain cover factor $K_p$ as defined therein. As EP-A-559437 discloses, the liquid rubber systems, whether present as added or as a reaction product or alone or together with a solid rubber, or solid rubber systems do not adequately overcome the problem of porosity. EP-A-559437 discloses crushing fabrics impregnated with a composition of epoxy resin, pre-curing agent and solid rubber either without reactive groups or with reactive groups. The preferred composition adds the solid rubber in a lightly cross-linked state.

In these known resin systems, the toughening effect is achieved by the generation of relatively large, infusible rubber particles which phase separated from the epoxy resin during curing. When curable compositions which have preformed rubber particles, eg U.S. Pat. No. 4,977,215 and U.S. Pat. No. 4,977,218, are used to make prepreg materials, the fibres have a filtering effect on the particles which effectively limits the toughening effect of the rubber to the interlaminar regions of the composite materials. Consequently, the intralaminar properties of such composite materials are enhanced, as a result of the presence of the rubber toughening agent, to a considerably lesser extent.

Furthermore, as discussed in relation to EP-A-559437, the fabrication of honeycomb and like load-bearing structures present particular difficulties. One such proposed application of honeycomb structures involves aerospace vehicle components, eg aircraft tail units, in which prepregs will be used to form a continuous skin over a honeycomb reinforcing member. Such structural components are required inter alia to have high low temperature tensile strength. As discussed above, EP-A-559437 proposes to overcome the problem of porosity by crushing the fabric. However, in all instances, it is necessary to use relatively low moulding pressures, eg approximately 0.3 MPa, to avoid crushing the honeycomb material.

Consequently, the rheological properties of the curable compositions considered for such use are critical since too high a viscosity will prevent resin flow into air pockets under the applied pressure, and thus will entrap volatile vapour which will nucleate to form voids, and too low a viscosity will cause the resin to flow out of the fibres even under the modest pressure applied.

The known proposed curable compositions discussed above have serious disadvantages when considered for such applications. For example, the use of thermoplastic tougheners results in a significant increase in the viscosity, and hence the elasticity, of the composition. The use of liquid rubbers alone does not significantly affect the viscosity, and hence the elasticity, of the compositions including them. The use of infusible particles alone has no significant effect on the viscosity of the composition and thus the elasticity is too low. The use of solid rubbers which are capable of cross-linking, ie when the infusible particles are formed in situ, results again in relatively high viscosity as the composition is heated sufficiently for the rubber to react. The use of lightly cross-linked solid rubbers, eg as in EP-A-559437, also gives rise to high viscosity compositions, hence the need to crush the fabric under high pressure to achieve high coverage. Additionally, in EP-A-559437, the use of non-reactive solid rubbers requires the use of special closely-woven fabrics and, again, hence the need to crush the fabric to achieve impregnation. Furthermore, in the crushed fabrics of EP-A-559437, the low pressures may result in poor bonding of the fabrics to the honeycomb structures by preventing sufficient flow of the composition to form adhesive fillets with the honeycomb walls.

It is a primary object of the invention to provide curable compositions utilising a solid rubber wherein said compositions give rise to cured polymer matrices throughout which the rubber is substantially dispersed to give homogeneous or fine particulate morphology.

It is also an object of the invention to provide such curable compositions in which the requisite rheological properties are generated for selected applications.

The objects of the invention are achieved by the provision of a curable composition in which a solid rubber has been pre-reacted in situ with at least a proportion of an epoxy resin present in the composition.

In particular, in accordance with the invention, a curable composition comprises epoxy resin having at least 0.05% by weight (based on said epoxy resin) of oligomeric epoxy species, at least one curing agent for said epoxy resin and a reaction product formed in situ between a solid rubber, which has at least 1 wt % of reactive groups and which is swellable by or soluble in a reaction mixture in which said reaction product is formed, and at least a proportion of said epoxy resin which includes said oligomeric species in rubber to epoxy resin weight of ratios between 1:1 and 1:20, wherein said epoxy resin comprises:

(a) at least one first epoxy resin monomeric component having an epoxy functionality of greater than three, preferably at least four;

(b) at least one second epoxy resin monomeric component having an epoxy functionality of greater than one but not more than three.

By reacting the rubber with the epoxy resin components prior to the addition of the remaining components of the curable composition, it has been found that the resultant curable composition is substantially homogeneous to look at, ie the rubber is not visibly detectable. In matrices obtained by curing the compositions according to the invention, the morphology is generally homogeneous but, if the rubber is detectable, ie particulate morphology, it is as very fine particles, ie substantially less than 5 $\mu$ and, more especially, not more than 1 $\mu$.

Additionally, as will be discussed in greater detail below, the viscoelastic properties of the curable composition are controllable to enable impregnation and subsequent fabrication of structures such as fabric-reinforced honeycomb structures to occur.

It has been found that the reaction producing the reaction product occurs primarily between the rubber and oligomeric epoxy species present in the epoxy resin. Provided such oligomeric species are present, the reaction product comprises either rubber reacted with at least a proportion of a mixture of both of said epoxy resin components; or, alternatively, rubber reacted with at least a proportion of one or other of said epoxy resin components. In a particularly preferred form of the invention, the reaction product comprises rubber reacted only with at least a proportion of said first epoxy resin component.

The amount of such oligomeric species present in the epoxy resin is at least 0.05% by weight, preferably at least 0.5%. In practice, however, epoxy resin systems contain significant quantities of oligomeric species which are created during the manufacture of said resins. The minimum quantities of such oligomeric species quoted above are derived from consideration of stoichiometric requirements based on potential reaction mechanisms. However, the types of oligomeric species present in the epoxy resin may differ from resin to resin depending upon the manufacturing route and, consequently, higher quantities of oligomeric species (to ensure the presence of sufficient quantities of appropriate reactive species) may be required. Thus, in practice, based on commercially-available epoxy resins, it is preferred that the epoxy resin has at least 5% by weight, preferably at least 7.5% by weight and especially at least 15% by weight of oligomeric species.

In making the reaction product, the rubber to epoxy resin weight ratios are between 1:1 and 1:20, preferably between 1:2.5 and 1:17 and especially between 1:2.5 and 1:16.5.

Preferably, the epoxy resin components comprise glycidyl derivative of one or more of:

aromatic diamines aromatic monoprimary amines aminophenols polyhydric phenols polyhydric alcohols polycarboxylic acids.

Examples of such compounds, which are useful as said first epoxy resin component, are as follows:

N, N, N', N'-tetraglycidyldiaminodiphenylmethane, eg "MY 9663" sold by Ciba-Geigy;

N, N, N', N'-tetraglycidyl-bis(4-aminophenyl)-1,4-diisopropylbenzene, eg Epon 1071 sold by Shell Chemical Co, viscosity 18–22 Poise at 110° C.;

N, N, N', N'-tetraglycidyl-bis(4-amino-3,5-dimethylphenyl)-1,4-diisopropylbenzene, eg Epon 1072 sold by Shell Chemical Co, viscosity 30–40 Poise at 110° C.;

gylcidyl ethers of phenol novolak resins, eg "DEN 438" sold by Dow, varieties in the low viscosity class of which are preferred in making compositions according to the invention and which are typically of formula:

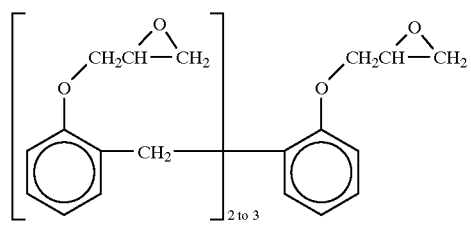

and gylcidyl ethers of bisphenol A novolak resins which are typically of formula:

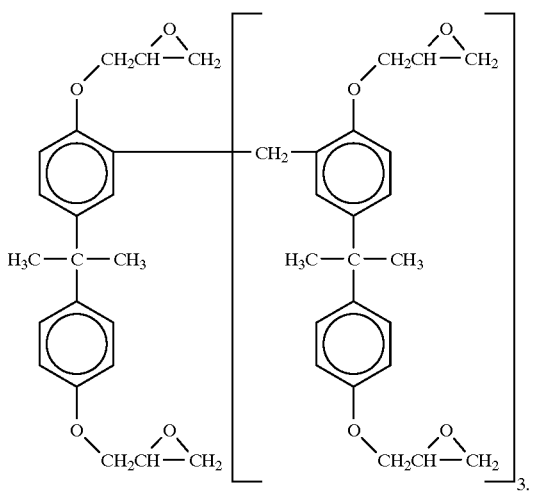

Particularly preferred for said first epoxy component is N, N, N', N'-tetraglycidyl diaminodiphenylmethane with an epoxide equivalent weight of 112 to 125.5.

Examples of gylcidyl derivatives which are useful as said second epoxy resin component are as follows:

digylcidyl ethers of bisphenol A based materials, eg DER 661 sold by Dow, which have the formula:

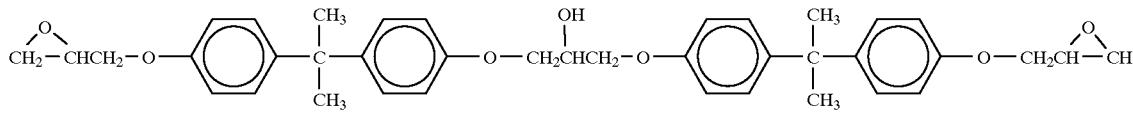

triglycidyl ethers of 4-aminophenol (eg "MY 0510" sold by Ciba-Geigy), viscosity 0.55–0.85 Pa s at 25° C.;

diglycidyl ether of bisphenol A (eg "Epikote 828" sold by Shell), which has a viscosity 8–20 Pa s at 25° C.;

digylcidyl 1,2-phthalate, eg GLY CEL A-100.

Particularly preferred for said second epoxy component are digylcidyl ethers of bisphenol A based materials having the formula given in the preceding paragraph and having an epoxide equivalent weight of 188 to 500.

Preferably, at least two curing agents are used, the first of the curing agents being capable of reacting with epoxy groups and of promoting reaction between hydroxyl groups and epoxy groups.

The curing agents are preferably an amino compound having a molecular weight up to 500 per amino group, for example an aromatic amine or a guanidine derivative. Particular examples suitable for use as the second curing agent are:

dicyanodiamide, ie:

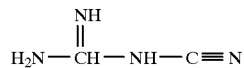

available as Amicure CG 1200 from Pacific Anchor Chemical;

4-chlorophenyl-N,N-dimethyl-urea, eg Monuron;

3,4-dichlorophenyl-N,N-dimethyl-urea, eg Diuron.

Preferably, said second curing agent is dicyanodiamide.

Particular examples suitable for use as the first curing agent are:

3,3'- and 4,4'-diaminodiphenylsulphone; methylenedianiline;

bis(4-amino-3,5-dimethylphenyl)-1,4-diisopropylbenzene available as EPON 1062 from Shell Chemical Co; and bis(4-aminophenyl)-1,4-diisopropylbenzene available as EPON 1061 from Shell Chemical Co.

Preferably, said first curing agent is 4,4'-diaminodiphenylsulphone.

The total amine content of the curing agent is in the range 70–110% of the stoichiometric requirement of the epoxy resin component.

If desired, a catalyst for the epoxy resin component/curing agent reaction may also be used. If such a catalyst is used, it is typically a Lewis acid, for example boron trifluoride, conveniently as a derivative with an amine such as piperidine or methyl ethylamine. Alternatively it can be basic, for example an imidazole or amine.

The rubber used to prepare the reaction product is selected from olefin, diene and nitrile rubbers and copolymers and terpolymers thereof which have pendant reactive groups, especially carboxylic groups. Particularly preferred are diene-nitrile copolymers having carboxylic groups. A particular preferred rubber is acrylonitrile/butadiene rubber having carboxylic groups. Preferably, the carboxylic groups are provided by a termonomer such as methacrylic acid. Preferably, the rubber contains at least 1 wt % preferably at least 2 wt % and more especially at least 2.25 wt % of carboxylic groups; and preferably upto 5 wt % carboxylic groups. The carboxylic group content is expressed as a weight % derived from the molecular weight of a carboxyl group divided by the molecular weight of the length of polymer chain to which it is attached expressed as a percentage. This translates as follows: 1 wt % is equivalent to 1 carboxylic group per 4500 $M_w$ ($M_w$=weight average molecular weight of the polymer chain); 2 wt % is equivalent to 1 per 2250 $M_w$; 2.25 wt % is equivalent to 1 per 2000 $M_w$. Particularly preferred rubbers are the acrylonitrile/butadiene/methacrylic acid rubbers available from Nippon Zeon under the trade name Hycar, especially Hycar 1472 (now available under the trade name NIPOL 1472) which has 3.75 wt % of carboxylic groups (ie 1 per 1200 $M_w$).

Preferably, the rubber has an $M_w$ of at least 30,000, preferably at least 100,000 and especially at least 150,000.

Preferably, the rubber is soluble or at least highly swellable in the epoxy resin.

Preferably, the curable composition comprises 1 to 20 wt %, preferably 1 to 10 wt %, and more especially 3 to 6 wt %, of rubber based on the total weight of epoxy resin, curing agent and reaction product in said composition.

In the preferred curable composition according to the invention wherein said reaction product is rubber reacted with said first epoxy component, the curable composition comprises 4.0 to 8.0 wt %, more especially 4.5 to 7.0 wt %, of rubber based on the total weight rubber and said first epoxy resin component. In this instance, said reaction product may contain all of said first epoxy resin: alternatively, said reaction product may contain only a proportion of said first epoxy resin.

The prereaction of the rubber with at least a proportion of said epoxy resin in situ enables a significant degree of control over the viscoelastic properties of the resultant curable composition to be exercised. The viscoelastic properties can be varied by varying the ratio of rubber to epoxy resin. As previously mentioned, the rubber to epoxy resin weight ratios of between 1:1 and 1:20, preferably between 1:2.5 and 1:17 and especially between 1:2.5 and 1:16.5 are to be used. Surprisingly, small variations in the rubber to epoxy resin ratio have a significant effect on the viscoelastic properties of the resultant curable composition.

A measure of the viscoelastic properties of the curable composition is possible by determining the Theological properties of the composition especially the storage or elastic modulus, G'. This is determined as described below in the Examples. In the curable compositions used for those applications in which significant moulding pressure cannot be used, the G' minimum of the curable composition is controlled within the range 20 Pa to 200 Pa, preferably within the range 40 Pa to 160 Pa and, more especially, within the range 80 Pa to 110 Pa.

The curable composition according to the invention may also contain other toughening agents such as thermoplastics optionally having reactive groups; other fillers such as fumed silica: aggregates, eg glass beads: polytetrafluoroethylene; graphite: boron nitride; mica; talc; vermiculite; nucleating agents; and stabilisers. However, such additional components will have an effect on the viscoelastic properties of the composition which has to be taken into account when formulating the reaction product.

Preferably, the invention includes composite material comprising the curable composition according to the invention and fibre reinforcement. Although the fibres may be any suitable fibres such as glass, carbon or organic polymers, preferably, the fibres are carbon fibres, especially graphite fibres. Graphite fibres which have been found to be especially useful in the invention are those supplied by Amoco under the trade designations T650-35, T650-42 and T300; those supplied by Toray under the trade designation T800-HB; and those supplied by Hercules under the trade designations AS4, AU4, IM 8 and IM 7.

The fibres may be short or chopped fibres, typically of mean fibre length not more than 20 mm, for example about 6 mm. Alternatively, and preferably, the fibres are continuous and may, for example, be unidirectionally-disposed fibres or a woven fabric, ie the composite material comprises a prepreg. Combinations of both short and/or chopped fibres and continuous fibres may be utilised. The fibres may be sized or unsized.

The total of the aforementioned other toughening agents, fillers, aggregates etc in the curable composition and the fibre reinforcement of any composite material comprising said curable composition should be such that the curable composition or composite material contains at least 20% by volume of such materials and/or reinforcing fibres. The percentages of fibres and such other materials are calculated on the total composition after curing.

The invention also includes composite materials comprising prepregs according to the invention laminated together by heat and pressure, for example by autoclave, compression moulding or by heated milers, at a temperature above the curing temperature of the curable composition.

When the fibres of the reinforcement are continuous and unidirectional, the resulting multi-ply laminated composite material may be anisotropic in which the fibres are oriented essentially parallel to one another or quasi-isotropic in each ply of which the fibres are oriented at an angle, conveniently 45° as in most quasi-isotropic laminates but possibly for example 30° or 60° or 90° or intermediately, to those in the plies above and below. Orientations which are between anisotropic and quasi-isotropic, and combination laminates, may be used. Suitable laminated composite materials contain at least four, preferably at least eight, plies. The number of plies is dependent on the application for the laminated composite material, for example the strength required, and laminated composite materials containing thirty-two or even more, for example several hundred, plies may be desirable. There may be aggregates, as mentioned above, in interlaminar regions.

When the prepreg comprises woven fabric, structures may be quasi-isotropic or between anisotropic and quasi-isotropic.

The invention also includes a composite material comprising prepreg according to the invention laid up on at least one side, and preferably with both opposed sides, of a honeycomb reinforcing component such as Nomex honeycomb available from Hexel, optionally with an adhesive layer interposed between the prepreg and the honeycomb component.

Also according to the invention, a process for making a curable composition as hereinbefore defined comprises forming a reaction mixture of said rubber, at least a proportion of said epoxy resin, a catalyst capable of promoting a reaction between epoxy groups and the reactive groups of said rubber and a polar solvent, said rubber, said epoxy resin and said catalyst comprising between 25 and 75 wt %, preferably between 35 and 65 wt %, more especially between 40 and 50 wt %, of the reaction mixture, heating the mixture to effect said reaction, cooling the resultant mixture to substantially ambient temperature and adding the remaining proportion, if any, of said epoxy resin and said first and second curing agents to the mixture and substantially removing the solvent therefrom.

Preferably, the mixture is heated to a temperature in the range 40° C. to 80° C., preferably under reflux.

The catalyst is preferably selected from the group consisting of alkyl triphenyl phosphonium iodide, bromide or chloride, wherein alkyl is methyl, ethyl, propyl, n-butyl, iso-butyl, n-pentyl or n-decyl, triphenyl phosphine, stannous octoate, chromium octoate, boron trifluoride, boron trifluoride monoalkyl (eg monoethyl) amine, especially ethyl triphenyl phosphonium iodide.

Composite materials according to the invention which comprise continuous fibres are made by preimpregnating the continuous fibres with the curable composition prior to removal of the solvent to form prepregs and removing the solvent from the prepreg, said prepreg optionally being consolidated between nip rollers.

The invention will now be illustrated by reference to the accompanying drawings and the following Examples. In the accompanying drawings:

FIG. 1 is a graphical representation of resin viscosity for a number of epoxy resin samples;

FIG. 2 is a graphical representation of G' minimum against resin viscosity of formulations using the resins shown in FIG. 1;

EXAMPLE 1

Figure 3:
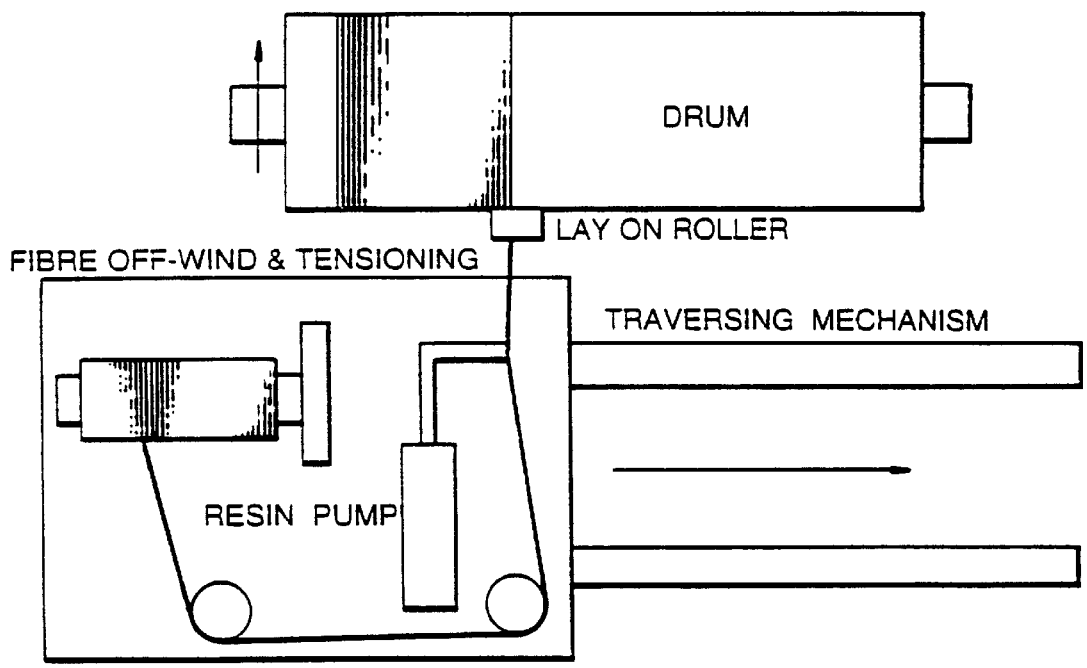
FIG. 3 is a schematic drawing of a drumwinding mechanism used to prepare prepregs.

A curable composition was made using the following components and formulation (pbw=parts by weight):

| | |
|---|---|
| First epoxy resin component - N, N, N', N'-tetraglycidyldiaminodiphenylmethane as MY 9663 sold by Ciba-Geigy | 76.53 pbw |
| Second epoxy resin component - diglycidyl ether of bisphenol A as DER 661 | 12.72 pbw |
| Curing agent - dicyanadiamide ("DICY") | 6.0 pbw |
| Rubber - an acrylonitrile/butadiene/methacrylic acid rubber as HYCAR 1472 from Nippon Zeon, Mn = 50000 to 53000, Mw = 156000, Tg = −18° C., acrylonitrile content = 29%, butadiene content = 67% and methacrylic acid content = 4%. | varying pbw - see table below |
| Catalyst - ethyl triphenyl phosphonium iodide ("ETPI") | 0.5 pbw |

The curable composition was made by preparing the reaction product in situ from a reaction mixture containing:

a) the rubber and all of the first epoxy resin component (Reaction Route A);

b) the rubber and all of the second epoxy resin component (Reaction Route B); or c) the rubber and all of both the first and the second epoxy resin components (Reaction Route C);

followed by the addition of the remaining ingredients. The method was as follows:

a) the respective epoxy resin component(s) was predissolved in acetone together with ETPI and the rubber;

b) the solution was stirred and heated under reflux for 2 hours;

c) the solution was then cooled to <40° C. and the remaining first epoxy resin component, if any, together with the second epoxy resin component was added and allowed to solubilise with stirring for 30 minutes;

d) DICY was then added to the mixture and it was stirred for a further 30 minutes; and e) the solvent was then removed by placing the solution in a vacuum oven for 30 minutes at 50° C. and <10 mm Hg.

Using this method, samples of curable compositions were made in which the reaction route was vaned and the rubber content was vaned within some of the reaction routes.

The viscoelastic properties of samples of the curable compositions were assessed rheologically. Typical conditions used to evaluate 2 ml samples, using a RMS 800 rheometer manufactured by Rheometrics Limited, were:

| | |
|---|---|
| Plate size | 40 mm |
| Gap | 1.6 mm |
| Initial Temperature | 70° C. |
| Final Temperature | 170° C. |
| Heating rate | 2.0° C./min |
| Strain rate | 10.0% |
| Oscillation | 10 rads/sec |
| Data Points | One every 30 sec. |

Details of the samples of curable compositions and the viscoelastic properties are given in Table 1 below.

TABLE 1

| SAMPLE | 1 | 2 | 3 | 4 | 5 | 6 | 7 | 8 |
|---|---|---|---|---|---|---|---|---|
| 1/1 | A | 5 | 76.53 | 15.31 | 5 | 75 | 13 | 130–150 |
| 2/1 | A | 4.75 | 76.53 | 16.11 | 4.76 | 60 | 8 | 130–150 |
| 3/1 | A | 4.25 | 76.53 | 18.01 | 4.28 | 40 | 5.5 | 130–150 |
| 4/1 | A | 4 | 76.53 | 19.13 | 4.04 | 30 | 5 | 130–150 |
| 5/1 | A | 3.75 | 76.53 | 20.41 | 3.79 | 13 | 3.1 | 130–150 |
| 6/1 | A | 3 | 76.53 | 25.51 | 3.06 | 3.5 | 1.5 | 130–150 |
| 7/1 | 8 | 4.75 | 12.72 | 2.68 | 4.76 | 200 | 22 | 100–140 |
| 8/1 | C | 5 | 89.25 | 17.85 | 5 | 15 | — | 140 |
| 9/1 | C | 4.75 | 89.25 | 18.79 | 4.76 | 6 | — | 140 |
| 10/1 | C | 4.25 | 89.25 | 21 | 4.28 | 5 | — | 140 |

Column 1 Reaction Route.
Column 2 Rubber content - pbw.
Column 3 Amount of epoxy resin component prereacted with rubber - pbw.
Column 4 Ratio of column 2:column 3.
Column 5 Rubber content - % based on all components except ETPI.
Column 6 G'minimum - Pa
Column 7 η* - complex viscosity - Pa.s
Column 8 Temperatune (°C.) at which G'minimum is attained.

EXAMPLE 2

A curable composition was made using the following components and formulation:

| | |
|---|---|
| First epoxy resin component - N, N, N', N'-tetraglycidyldiaminodiphenylmethane as MY 9663 sold by Ciba-Geigy | 63.75 pbw |
| Second epoxy resin component - digylcidyl ethers of bisphenol A as EPON 291 (a 50:50 mixture of EPON 1001F and EPON 828 sold by Shell Chemical Co | 12.0 pbw |
| First curing agent - dicyanodiamide ("DICY") | 2.5 pbw |
| Second curing agent - 4,4'-diaminodiphenylsulphone ("DDS") Rubber - an acrylonitrile/butadiene/methacrylic acid rubber as HYCAR 1472 from Nippon Zeon, Mn = 50000 to 53000, Mw = 156000, Tg = −18° C., acrylonitrile content = 29%, butadiene content = 67% and methacrylic acid content = 4%. | 17.0 pbw varying pbw - see table below |
| Catalyst - ethyl triphenyl phosphonium ioidide ("ETPI") | 0.5 pbw |

The curable composition was made by prereacting the rubber with all or part of the first epoxy resin component using the method described in Example 1 (both DDS and DICY were added at step d)).

Using this method, samples of curable compositions were made in which the rubber content was varied; in which the amount of first epoxy resin component was vaned; and in which the rubber and the first epoxy resin component were varied but the ratio between them was held constant.

The viscoelastic properties of samples of the curable compositions were assessed rheologically as described in Example 1.

Details of the samples of curable compositions and the viscoelastic properties are given in Table 2 below.

TABLE 1

| SAMPLE | 1 | 2 | 3 | 4 | 5 | 6 | 7 | 8 |
|---|---|---|---|---|---|---|---|---|
| 1/2 | 4.75 | 63.75 | 13.42 | 4.75 | 6.9 | 150 | 18 | 100–130 |
| 2/2 | 4.6 | 63.75 | 14.17 | 4.51 | 6.59 | 100 | 8 | 100–130 |
| 3/2 | 4.25 | 63.75 | 15 | 4.27 | 6.25 | 65 | — | 130–150 |
| 4/2 | 4 | 63.75 | 15.94 | 4.03 | 5.9 | 40 | 2.5 | 130–150 |
| 5/2 | 3.75 | 63.75 | 17 | 3.79 | 5.55 | 22 | 2 | 130–150 |
| 6/2 | 3.5 | 63.75 | 18.21 | 3.54 | 5.2 | 15 | 1.5 | 130–150 |
| 7/2 | 3.25 | 63.75 | 19.62 | 3.3 | 4.85 | 8 | 1 | 130–150 |
| 8/2 | 3.25 | 53.63 | 16.5 | 3.3 | 5.71 | 33 | 3.5 | 130–150 |

TABLE 1-continued

| SAMPLE | 1 | 2 | 3 | 4 | 5 | 6 | 7 | 8 |
|---|---|---|---|---|---|---|---|---|
| 9/2 | 3.25 | 43.5 | 13.38 | 3.3 | 6.95 | 62 | 5 | 120–140 |
| 10/2 | 3.25 | 36 | 11.08 | 3.3 | 8.28 | 120 | 5 | 100–130 |
| 11/2 | 3.25 | 30 | 9.23 | 3.3 | 9.77 | 180 | 10 | 100–130 |
| 12/2 | 3.75 | 50 | 13.33 | 3.3 | 5.55 | 90 | 10 | 100–130 |

Column 1  Rubber content - pbw.
Column 2  Amount of epoxy resin component prereacted with rubber - pbw.
Column 3  Ratio of column 1:column 2.
Column 4  Rubber content - % based on all components except ETPI.
Column 5  Rubber content - % based on rubber + total amount of first epoxy resin component.
Column 6  G'minimum - Pa
Column 7  η* - complex viscosity - Pa.s
Column 8  Temperature (°C.) at which G'minimum is attained.

EXAMPLE 3

The effect of oligomer content of the epoxy resin was investigated as follows:

The viscosity of various MY epoxy resin graces available from Ciba-Geigy were determined using a CARIMED viscometer at 50° C. using a shear rate of 0.5 and the results are given in FIG. 1. The viscosity of the epoxy resins is directly attributable to the level of higher oligomeric species of the monomeric material present in the resins, ie oligomers of pure glycidyl methylenedianiline (epoxide equivalent weight=125), ie

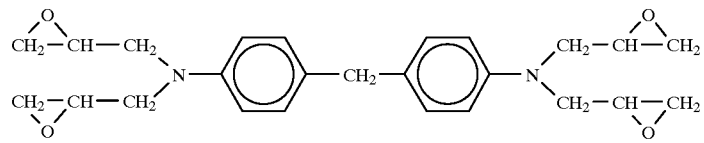

This was confirmed using high pressure liquid chromatography (HPLC).

63.75 pbw of some of the resins were then reacted with 5.0 pbw of NIPOL 1472 (Mw=170000) and 0.5 pbw of ETPI in acetone, the mixture having a pre-reaction solids content of 45%. The reaction mixture was then heated and held at reflux for 2 hours before being cooled to room temperature. To the mixture was added 17.0 pbw of DDS, 2.5 pbw of DICY, 6.0 pbw of EPON 828 (a difunctional epoxy resin based on bisphenol A supplied by Dow Chemicals—epoxide equivalent weight=344), 6.0 pbw of EPON 1001F (a difunctional epoxy resin based on bisphenol A supplied by Dow Chemicals—epoxide equivalent weight=500; this is a higher molecular weight analogue of EPON 828) and sufficient acetone to give a prepreg solution having a solids content of 50% by weight.

Resin samples for rheological examination were taken and placed in a vacuum oven at 60° C. for 30 min to remove acetone. The samples were then rheologically tested to determine the G' minimum.

This investigation revealed that the "purer" resin MY721, ie low oligomer content, produced a significantly lower rheological response, ie G' minimum, after the reaction product is formed than the other resins. This was repeated for several batches of NIPOL 1472 (varying molecular weight) with similar results. The results are plotted in FIG. 2 giving high/low figures (which result from the variations in molecular weight). In FIG. 2 the resin viscosities are quoted and, thus, the resin is identifiable from the following Table 3:

TABLE 3

| Resin | Viscosity (Pa.s) |
|---|---|
| MY721 | 4.4 |
| MY9655 | 9.4 |
| MY9512 | 11.39 |
| MY9634 | 15.5 |
| MY9663 | 19.2 |

HPLC was used to examine some of the resins both before and after the reaction with the rubber. The results are given in Table 4.

In Table 4, the figures in the rows are the areas of the peaks obtained using HPLC for the various components of the resins and they are proportional to the quantities of the resin components present. The large figures, eg 68.4 etc, represent the amount of monomer present; the figures in the rows above the monomer row are derived from remnant starting materials from which the monomer is made; and the figures in the rows below the monomer row are derived from oligomeric species that are present.

As can be seen, in each instance, the post-reaction oligomeric levels have dropped significantly compared to the pre-reaction levels.

TABLE 4

| MY9663 | | MY9512 | | MY721 | |
|---|---|---|---|---|---|
| Prior to Pre-reaction | Post Pre-reaction | Prior to Pre-reaction | Post Pre-reaction | Prior to Pre-reaction | Post Pre-reaction |
| 0.4 | 0.2 | 0.4 | 0.2 | 1.7 | 1.1 |
| 2.3 | 1.9 | 0.3 | 0.3 | 1.8 | 1.2 |
| 68.4 | 749 | 1.5 | 1.3 | 1 | 1.5 |
| 6.2 | 53 | 754 | 80.1 | 86.6 | 89.1 |
| 0.4 | 0.2 | 6.3 | 4.7 | 4 | 3.4 |
| 17.8 | 14.8 | 2 | 0.8 | 1.1 | 0.6 |
| 3.9 | 2.5 | | | | |

EXAMPLE 4

The procedure described in Example 3 was used to determine G' minimum for samples made using varying weights of NIPOL 1472 of differing molecular weights (determined using Gel Permeation Chromatography using tetrahydrofuran as the solvent phase and at 40° C. and a polystyrene calibration curve). The results are listed in Table 5 below.

EXAMPLE 5

A formulation, Sample 1/5, as used in Example 2 but using 5.0 pbw of rubber was prepared along with two further samples in one of which, Sample 2/5, the catalyst ETPI was omitted and in the other of which, Sample 3/5, the ingredients were merely blended together, again the catalyst ETPI being omitted. The rheological properties of the formulations were assessed and are given in Table 6.

TABLE 5

| NIPOL 1472 Batch | Mw of NIPOL 1472 Batch | G' minimum (Pa) - 4.25 pbw | G' minimum (Pa) - 5.0 pbw | G' minimum (Pa) - 525 pbw |
|---|---|---|---|---|
| 1 | 155600 | 55.5 | 360 | 515 |
| 2 | 164000 | 46 | 130 | 200 |
| 3 | 170000 | 9.3 | 100 | 202 |
| 4 | 171000 | 38.5 | — | 136 |
| 5 | 178000 | 16 | 90 | 183 |
| 6 | 184000 | 17.5 | 86.5 | 136.5 |
| 7 | 185000 | 12 | 75 | 128 |

TABLE 6

| SAMPLE | G'minimum (Pa) | η* (Pa.s) |
|---|---|---|
| 1/5 | 130 | 13 |

TABLE 6-continued

| SAMPLE | G'minimum (Pa) | η* (Pa.s) |
|---|---|---|
| 2/5 | 2 | 0.6 |
| 3/5 | 6 | 1.3 |

EXAMPLE 6

A variety of formulations, see Table 7, were used to impregnate unidirectional fibres to produce prepregs which were laid up, consolidated and subjected to mechanical property assessment, the results from which are given in Table 8 (which includes −75° F. (−60° C.) Tensile results obtained in Example 8 but reproduced in Table 8 for convenience).

Method for Blocking Carboxylic Groups

Into a 1,000 ml reaction flask equipped with a paddle stirrer, thermometer, nitrogen inlet and condenser was charged NIPOL 1472 rubber (128.2 og, 0.000706 mols, this weight includes 6.4 wt % talc) and 950 mis methylethyiketone (MEK). Once solution was complete, phenylglycidylether (32.00 g, 0.2131 moles ) and ETPI (5.36 g, 0.0128 moles) were added to the NIPOL 1472 rubber solution. The reaction temperature was raised by means of an oil bath, so that the MEK was gently refluxing. The reaction temperature was maintained for 2 hours and then cooled to room temperature.

TABLE 7

| SAMPLE | FORMULATION | G' minimum (Pa) | η* (Pa.s) |
|---|---|---|---|
| 1/6 | As Sample 1/5 (ie in accordance with the invention). | 100 | 12 |
| 2/6 | As Sample 2/5 (ie without EPTI). | 2 | 0.7 |
| 3/6 | As Sample 3/5 (ie blended). | 6 | 1.5 |
| 4/6 | As Sample 1/6 but without any NIPOL 1472 present. | * | * |
| 5/6 | As Sample 1/6 but using NIPOL 1472 in which 20% of the carboxylic groups have been blocked**. | 70 | 8 |
| 6/6 | As Sample 1/6 but using NIPOL 1472 in which 40% of the carboxylic groups have been blocked**. | 3 | 1 |
| 7/6 | As Sample 1/6 but using NIPOL 1472 in which 55% of the carboxylic groups have been blocked**. | 2 | 0.8 |
| 8/6 | As Sample 1/6 but using NIPOL 1472 in which 100% of the carboxylic groups have been blocked**. | 2 | 0.6 |
| 9/6 | As Sample 1/6 but using NIPOL DN 300 W 45 (available from Nipon Zeon; $M_w$ = 240000: an acrylonitrile/butadiene rubber having no reactive functionality) instead of NIPOL 1472. | 0.4 | 0.2 |
| 10/6 | As Sample 1/6 but substituting CTBN 1300 x 13 (available from Nipon Zeon; $M_w$ = 13700; an acylonitrile/butadiene/acrylic acid rubber) 50% by weight of the NIPOL 1472. | 0.1 | 0.3 |
| 11/6 | As Sample 1/6 but using CTBN 1300 x 13 (available from Nipon Zeon; $M_w$ = 13700; an acylonitrile/butadiene/acrylic acid rubber) instead of NIPOL 1472. | 0.2 | 0.2 |
| 12/6 | As Sample 1/6 but using E2016 (available from ICI Acrylics; $M_w$ = 13700; an acrylic polymer containing 0.6 wt % of carboxylic groups) instead of NIPOL 1472. | 1 | 0.35 |
| 13/6 | As Sample 1/6 but using E2016 (available from ICI Acrylics; $M_w$ = 13700: an acrylic polymer containing 20 wt % of carboxylic groups) instead of NIPOL 1472. | 2 | 0.35 |

*unable to measure owing to extremely low viscosity.
**see method for blocking carboxylic groups below.

During the reaction, 5 ml samples were withdrawn at various intervals. These samples were then titrated with 0.01 N potassium hydroxide to ascertain the degree of reaction.

The reaction solution, on cooling to room temperature, was poured into a large crystallising dish to allow the bulk of the MEK to evaporate off. The resultant blocked rubber was then leached with propan-2-ol to remove the excess phenylglycidylether. Finally, the blocked rubber was dried for 20 hours at 60° C. in a vacuum oven. The degree of reaction (100% in this case) was assessed by titration as described above and by FTIR.

The 20%, 40% and 55% blocked rubbers were obtained by a similar procedure.

Formulation of Prepregging Solution (Samples 1/6, 3/6 and 5/6 to 13/6)

Into a 700 ml reaction flask equipped with a metal paddle stirrer, nitrogen inlet and condenser was charged MY 9663 (255.00 g), ETPI (2.00 g) and NIPOL 1472 (20.00 g) dissolved in 250 g of acetone. A further 80 g of acetone was then added to make the solids content of the reaction mixture up to 45% w/w.

The temperature of the reaction flask raised by means of an oil bath to reflux the acetone. This temperature was then maintained for 2 hours following which the heat was switched off and the temperature was allowed to drop to 40° C. An Epon1001F/Epon 828 (50:50) epoxy mixture (48.00 g) was then added. The temperature of the reaction flask was then allowed to cool to room temperature at which time DDS (68.00 g) and DICY (10.00 g) were added.

The reaction mixture (DICY is insoluble in acetone) was allowed to stir for a further 10 to 15 minutes or until all the DDS was in solution. Finally a further amount of acetone was then added so that the resin solids content measured between 54% w/w and 60% w/w depending on the resin density.

Formulation of Prepregging Solution (Samples 2/6 and 4/6)

Into a 700 ml reaction flask equipped with a metal paddle stirrer, nitrogen inlet and condenser was charged MY 9663 (255.00 g), NIPOL 1472 (20.00 g) dissolved in 280 g of acetone and EPON 1001F/EPON 828 (50:50) epoxy mixture (48.00 g). A further 50.00 g of acetone was then added to make the solids content up to 45% w/w.

The temperature of the reaction mixture was raised to 40° C. to aid solubility of the MY 9663 and Epon epoxy mixture in the acetone. Once solution was complete the heat was removed. Then DDS (68.00 g) and DICY (10.00 g) were added. The reaction mixture was allowed to stir at room temperature for ½ hour or until all the DDS was in solution. Acetone was then added to give the required resin solids content for prepregging (55% w/w–60% w/w).

Unidirectional Carbon Fibre Impregnation by Drumwinding (Wilton)

The formulated resin solution (1 liter) was poured into a resin pump (see FIG. 3) of a drumwinder. The drum on the drumwinder was set to a temperature of 55° C. to ensure complete volatilisation of the solvent. Each run on the drumwinder produced 1 m$^2$ of prepreg. Two runs were carried out for each of the formulated Samples 1/6 to 13/6. The following process conditions were utilised so that a resin content on the prepreg of between 35% w/w and 42% w/w (determined gravimetrically) was achieved:

| Fibre | Amoco T300 (12K). |
|---|---|
| Drum Temperature | 55° C. |
| Drum Speed | 1 0 rpm |
| Pump Speed | 5.2 rpm |

Unidirectional Composite Fabrication

The appropriate number of plies were cut to size from the prepreg and laid up. The number of plies and their dimensions were dependant on the type of mechanical test to be performed. Transflexural Strength (TFS), Modulus, Tg determination, Short Beam Shear (SBS) and morphology required a test panel of 16 plies ($[0]_{16}$) and dimensions of 6 inches by 4 inches (152.4 mm by 101.6 mm). Toughness ($G_{1C}$) measurement required a test panel of 20 plies ($[0]_{20}$) with dimensions of 14 inches by 6 inches (355.6 mm by 152.4 mm). The plies were laid up by sequentially ironing them together with an iron set at 50° C.

Figure 4:
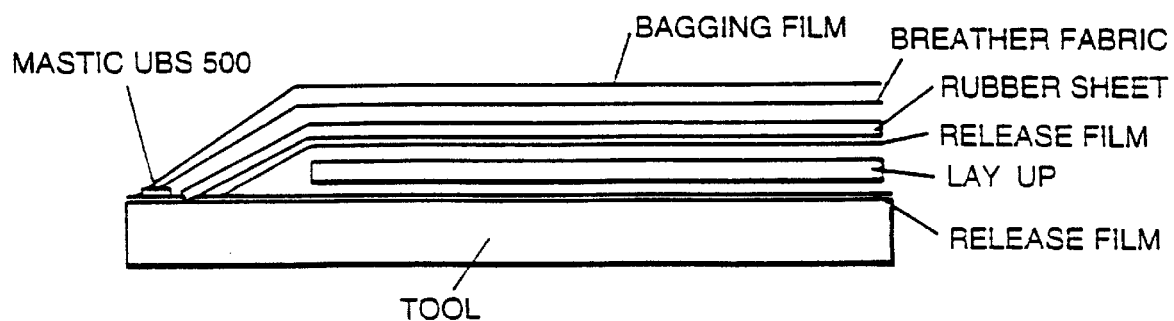
FIG. 4 is a schematic cross-sectional drawing of a layup and tool used to prepare consolidated samples for testing.

The laid up plies were then inserted into a pressclave and bagged up according to the arrangement shown in FIG. 4. The composite panels in this study were pressclaved according to the BMS 8 256 moulding cycle outlined below:
1. Room temperature Start.
2. Ramp at 2° C. per min to 180° C.
3. Hold at 180° C. for 120 minutes.
4. Ramp at 2° C. per min to Room Temperature.

Vacuum is applied at the start to consolidate the lay up and is then released so that the panel is left open to vent. A pressure of 45 psi (0.31 MPa) is also applied at the start and held at this pressure through out the moulding cycle.

Transflexural Strength was determined using test specimens obtained from a $[0]_{16}$ panel with a nominal thickness of 2 mm. The specimen size used was 10 mm×70 mm and these were cut using a diamond saw. The test was carried out on a Instron 6022 machine using a standard 3 point bend arrangement with a support span of 50 mm and tested at a speed of 1 mm/min. The stress to cause failure was recorded. An average of 8 samples was taken to give a final TFS value for each of the composite systems studied. Fracture surfaces were examined both visually, to check for fibre misorientation and by SEM to discover the nature of failure.

Flexural Modulus was determined using test specimens were cut from a $[0]_{16}$ panel that had a nominal thickness of 2 mm. The dimensions of the specimens were 140 mm×10 mm. Testing was carried out on an Instron 6022 machine set up in 3 point bend mode with a support span of 100 mm, thus giving a span to depth ratio of 50:1. The test was performed at a rate of 1 mm/min. The test was manually stopped when the central deflection was equal to the specimen thickness (approx 2 mm). An average of 4 specimens was taken as the final result.

To Measurement by DMTA—the samples were run on a power head, P1 DMTA under nitrogen with a heating rate of 2° C. per minute. A single cantilever method was employed, the sample is clamped at one end and oscillated at the other end with a frequency of 10 Hz.

Short Ream Shear was determined using test specimens which were machined from a $[0]_{24}$ panel with a nominal thickness of 3 mm. The specimen size used was 25 mm×10 mm (0° in 25 mm direction) and these were cut using a diamond saw. The test was carried out on a Instron 6022 testing machine with a three point bend set up using a support span of 15 mm giving a span to depth ratio of 5:1. The test speed used was 1 mm/min and an average of 8 samples was taken to give the final result. The mode of failure was also recorded.

$G_{1C}$ Testing The $G_{1C}$ testing was determined using panels used for this test were $[0]_{20}$ 6 inch×14 inch (152.4 mm by 101.6 mm) that had a crack starter (FEP—0.02 mm thick) 3 inch×6 inch (76.2 mm×152.4 mm) placed in between plies 10 and 11. Prior to testing the panels were C-scanned then samples were cut to a size of 1"×14" for double cantilever beam testing. Specimens were precracked by loading them at a crosshead rate of 0.05 inch/min until the crack reached a length of 1 inch beyond the FEP crack starter. Specimens were then tested at a rate of 0.05 inch/min in tension. Results quoted are $G_{1C}$ of propagation.

Morphology was determined using $[0]_{16}$ unidirectional panels. Small samples of the composites were cut and mounted in cold-curing epoxy resin. These samples were then polished to a fine finish using a Buehler Metserv automatic polishing machine. To reveal the morphological structure samples were etched in a 1% w/v solution of $KMnO_4$ in "super acid" (which is a mixture of 5:5:2 by volume of conc. sulphuric acid: phosphoric acid : distilled water respectively). Samples were etched in this solution for 10 minutes then washed under flowing water for 30 mins. The samples were then cut from the mounting epoxy resin and attached to stubs for SEM analysis. SEM samples were gold coated prior to analysis.

EXAMPLE 7

Certain of the formulations used in Example 6 were repeated using the methods described below and for convenience the same sample numbering is utilised.

Formulation of Prepregging Solutions

The rubber to be used was solvated in acetone. The rubber solution, MY9663 and ETPI were mixed for 10 minutes until homogeneous. This mixture was then heated to reflux (approx 57° C.) and held for 2 hours. The solution had approximately 45% resin solids during the reflux. After the two hour reflux, the heating apparatus was removed and the Epon 828 and Epon 1001F were added immediately to the solution. This was allowed to mix until the solid 1001F had completely dissolved into the solution. With the solution mixed well and cooled to approaching room temperature, the DDS and DICY were added to the mixture. 0.01% by weight Aerosil 974 (fumed silica available from De Gussa) was also added at this point and allowed to mix until homogeneous. All additions to the solution are washed with acetone. The final solution had approx. 55% resin solids content. This was adjusted (as needed) during impregnation.

Samples 1/6, 3/6 and 5/6 to 7/6 were prepared using this process.

Samples 2/6 and 8/6 were prepared using the process just described except that there was no reflux of the rubber solution and MY 9663 epoxy. The components were all simply added to the vessel and mixed at room temperature.

Sample 4/6 was prepared similarly to Samples 2/6 and 8/6 except that there was no rubber added to the mix. The percent amounts of each component was altered somewhat to compensate for the 5% lost from the rubber as follows: MY9663 - 66.32; Epon 828 - 6.32; Epon 1001F - 6.32; DDS - 17.89; DICY - 2.63; ETPI - 0.53; Aerosil 974 - 0.05.

TABLE 8

| SAMPLE | TFS (MPa) | SBS (MPa) | MODULUS (MGa) | $T_1$(°C.) | $G_1$, (KJm²) | MORPHOLOGY | −75° F. TENSILE STRENGTH |
|---|---|---|---|---|---|---|---|
| 1/6 | 82.32 (9.20) | 56.6 (2.10) | 44.90 (0.98) | 152.81 | 0.228 (0.026) | Homogeneous | 579.3 |
| 2/6 | 151.90 (6.00) | 66.33 (4.40) | 70.50 (0.87) | 206.52 | 0.177 (0.019) | 2-phase fine particulate | 533.9 |
| 3/6 | 97.24 (5.23) | 87.11 (2.40) | 77.00 (0.40) | 204.26 | 0.191 (0.013) | 2-phase relatively coarse particulate | NA |
| 4/6 | 90.88 (8.90) | 53.66 (7.10) | 87.90 (0.62) | 187.83 | 0.371[1] (0.093) | homogeneous | 498.8 |
| 5/6 | 110.9 (4.90) | 107 (6.20) | 63.20 (0.57) | 201.59 | 0.329 (0.014) | coarse irregular particulate | 586.2 |
| 6/6 | 83.02 (5.20) | 50.39 (2.10) | 70.40 (0.91) | 191.47 | 0.203 (0.023) | coarse irregular particulate | 570.3 |
| 7/6 | 83.23 (6.54) | 51.22 (3.10) | 69.60 (0.21) | 201.52 | 0.337 (0.033) | coarse irregular particulate | 517.4* |
| 8/6 | (110.8) (6.24) | 59.6 (2.40) | 81.90 (0.90) | 176.19 | 0.212 (0.046) | large particulate | 482.9 |
| 9/6 | 74.71 (0.89 | 46.60 (6.80) | 58.34 (0.30) | 179.36 | 0.298[1] (0.056) | coarse irregular particulate | 494.7 (80.5) |
| 10/6 | 84.23(6.10) | 49.77 (3.20) | 43.90 (0.90) | 174.29 | 0.694[1] (0.120) | NA large particulate | NA NA |
| 11/6 | 103.1 (7.40) | 74.21 (0.10) | 90.69 (0.57) | 181.99 | 0.236 (0.039) | | |
| 12/6 | 105.6 (16.9) | 77.41 (2.10) | 85.80 (0.80) | 184.25 | 0.277 (0.034) | gross phase separation owing to immiscibility/ insolubility of acrylic polymer in epoxy resin | NA |
| 13/6 | 75.2 (3.7) | 72.3 (3.10) | 80.70 (0.20) | 166.16 | 0.229 (0.044) | gross phase separation owing to immiscibility insolubillity of acrylic polymer in epoxy resin | NA |

Standard deviations are in brackets.
*A 85% blocked Hycar 1472 was used.
[1]Panel gave poor C-Scan result.

Fabric Impregnation

Figure 5:
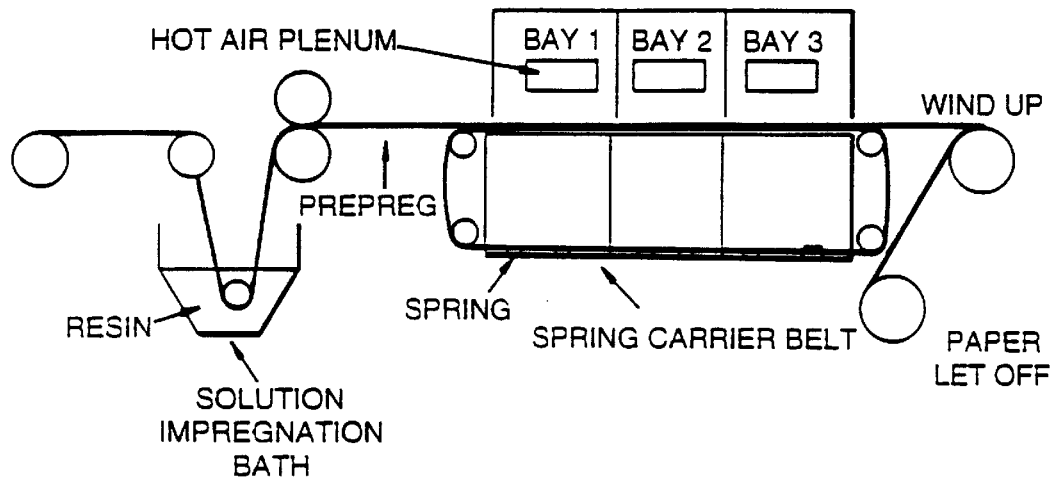
FIG. 5 is a schematic drawing of prepregging equipment used to prepare pregpregs.

The formulated Samples (2–5 liters) were poured into an impregnation bath contained within a solution impregnation semi-technical unit and outlined below in FIG. 5:

The following process conditions were used to achieve a final resin solids content an the prepreg of 40%+2%:

| Fabric | W-322/70° C., Amoco T300, 3K, Plain weave. |
|---|---|
| Width | 30 inches (762 mm). |
| Line speed | 18 inches per min (7.82 mm/sec). |
| Resin concentration | 50% w/w in acetone. |

-continued

| | |
|---|---|
| Resin specific gravity | 1.000–1.005 |
| Oven Bay Temperatures | Bays 1 & 2 set to 60° C., bay 3 set at 116° C. |

The impregnated fabric was then transferred to the tape line and compacted under the following set of conditions:

| | |
|---|---|
| Line speed | 35 inches per min (14.8 mm/sec). |
| 1st Nip Temperature | Room Temperature |
| 1st Nip Pressure | 5 psi (0.034 MPa) |
| Hot Plate Temperature | 88° C. |
| 2nd Nip Temperature | 88° C. |
| 2nd Nip Pressure | 20 psi (0.14 MPa) |

The plies were cut from the prepreg and a $[0,90]_8$ was prepared using 12 inch by 12 inch (304.8 mm by 304.8 mm) squares for testing −75° F. (−60° C.) Tensile test and moulded similarly to the test composites prepared in Example 6. This test was performed using a 9 inch (228.6 mm) tensile bar, ie waisted, held at −75° F. (−60° C.) on a standard test machine at a load rate of 1.27 mm/min. The results of this test are quoted in Table 8 above. As can be seen, compositions according to the invention perform surprisingly well in this test which is considered especially important in the aerospace industry since aerospace vehicles are frequently subjected to very low temperatures during flights.

Figure 6:
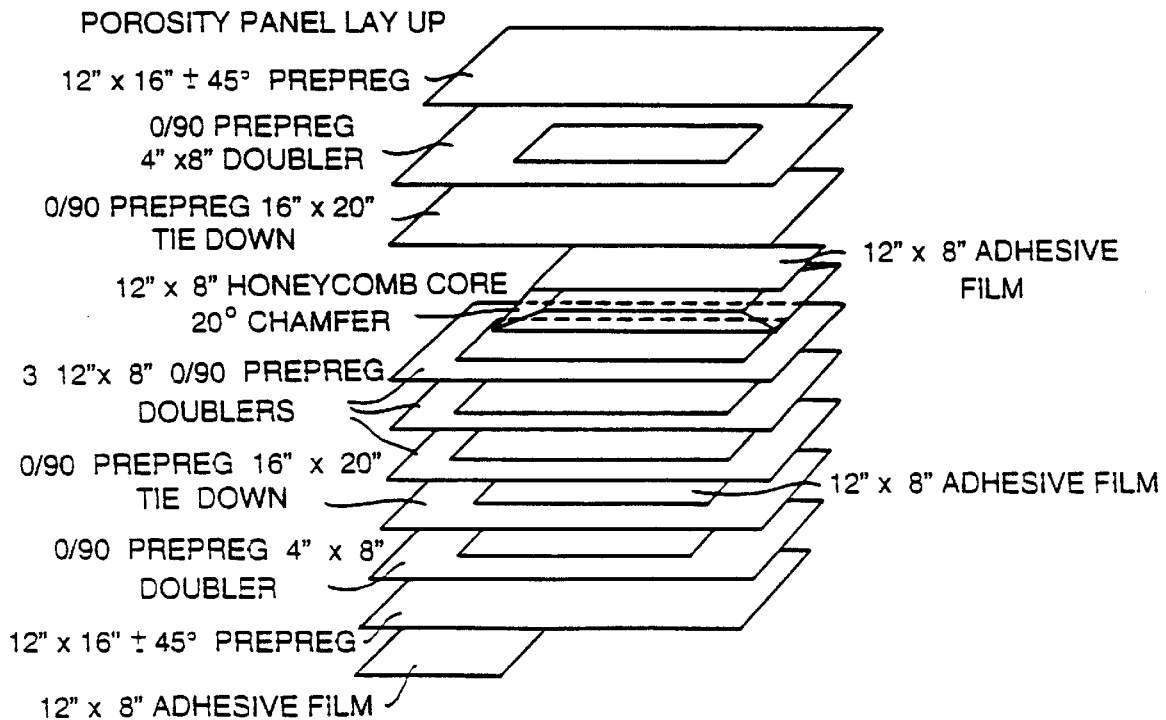
FIG. 6 is a schematic perspective drawing of a layup used to prepare consolidated honeycomb-reinforced samples for testing.
Figure 7:
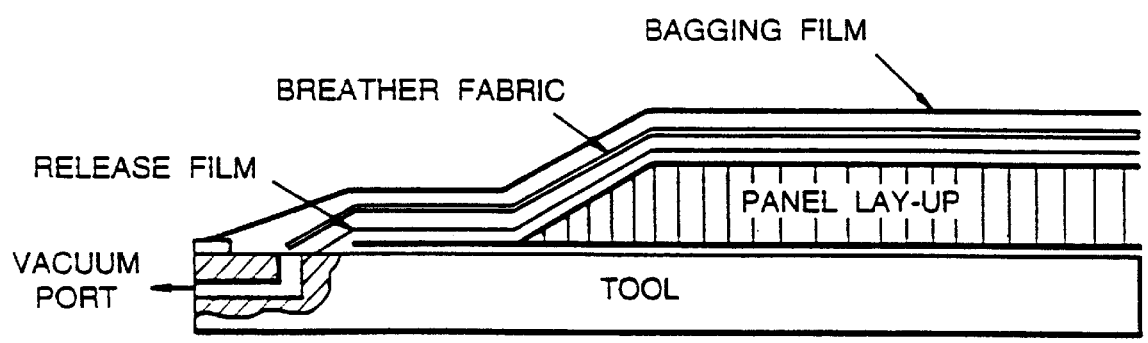
FIG. 7 is a schematic cross-sectional drawing of a layup and tool used to prepare the samples shown in FIG. 6.

A porosity panel was also prepared in which fabric was bonded to a honeycomb structure using the layup illustrated in FIG. 6. The panel was consolidated by being placed into a bag, as illustrated in FIG. 7, and autoclaved. The panels are sectioned into two equal halves from which a 1 inch (25.4 mm) wide strip is then cut and mounted in epoxy resin. The specimen is then polished to a high surface finish and the number of pores along the length of the panel are counted using a light microscope. If any significant pores are observed, the panel is failed. The results are given in Table 9.

TABLE 9

| SAMPLE | EDGEBAND | BAGSIDE | TOOLSIDE | PASS/FAIL |
|---|---|---|---|---|
| 1/6 | Good, some small porosity near chamfer tip | Chamfer - Good<br>3-ply area - Good<br>2-ply area - Good | 3-ply area - 1 medium void at interface<br>2-ply area - Good | PASS |
| 2/6 | Good | Chamfer - Several small voids<br>3-ply area - 2 big voids<br>2-ply area - 2 big voids | 3-ply area - 1 large void + 6 medium voids<br>2-ply area - Poor - repeating pores | FAIL |
| 4/6 | Repeating voids | Chamfer, 3-ply and 2-ply area - Repeating voids | 3-ply area and 2-ply area - Repeating pores | FAiL |
| 5/6 | 8 Medium voids | Chamfer - 4 voids<br>3-ply area - OK<br>2-ply area - 4 medium voids | 3-ply area -> 8 medium/large voids<br>2-ply area - Good | FAIL |
| 6/6 | 2 Medium voids | Chamfer - 1 void<br>3-ply area and 2-ply area - Repeating pores | 3-ply area -> 10 repeating voids<br>2-ply area -> 5 medium/small voids | FAIL |
| 7/6 - but 0.85 blocked | >15 voids, poor | Chamfer - Poor<br>3-ply area and 2-ply area - Poor | 3-ply area and 2-ply area - Poor | FAIL |
| 8/6 | Poor | Chamfer - OK<br>3-ply area - 2 small voids<br>2-ply area - Good | 3-ply area and 2-ply area - Poor | FAIL |
| 9/6 | Poor - large voids | Chamfer, 3-ply and 2-ply area - Repeating voids | 3-ply area - 7 large voids and 2-ply area - 6 small voids | FAIL |

We claim:
1. A curable composition comprising an epoxy resin system, wherein said epoxy resin system comprises:
an epoxy resin comprising at least one first epoxy resin component and at least one second epoxy resin component, at least one curing agent for said epoxy resin, and a reaction product formed in situ by prereaction between a solid rubber and at least a proportion of said at least one first epoxy resin component in a rubber to first epoxy resin component weight ratio of between 1:1 and 1:20,
wherein each of said at least one first epoxy resin component comprises monomers having an epoxy functionality of greater than 3 and at least 0.05 wt % of oligomers of said monomers, and wherein each of said at least one first epoxy resin component is independently a polyglycidyl derivative or an oligomer of a polyglycidyl derivative of at least one compound selected from the group consisting of aromatic diamines, aromatic monoprimary amines and aminophenols,
wherein each of said at least one second epoxy resin component has an epoxy functionality of greater than 1 but no more than 3, and
wherein said solid rubber has at least 1 wt % of reactive groups, and wherein said solid rubber is swellable or soluble in a reaction mixture in which said reaction product is formed.
2. A curable composition according to claim 1 wherein said rubber to first epoxy resin component weight ratio is between 1:2.5 and 1:17.

3. A curable composition according to claim 2 wherein said rubber to first epoxy resin component weight ratio is between 1:2.5 and 1:16.5.

4. A curable composition according to claim 1 wherein said second epoxy resin component is a polyglycidyl derivative or an oligomer of a polyglycidyl derivative of at least one compound selected from the group consisting of aromatic diamines, aromatic monoprimary amines, aminophenols, polyhydric phenols, polyhydric alcohols, and polycarboxylic acids.

5. A curable composition according to claim 1 wherein said first epoxy resin component is selected from the group consisting of monomers and oligomers of $N,N,N^1,N^1$-tetraglycidyl diaminodiphenylmethane and $N,N,N^1,N^1$-tetraglycidyl-bis (4-amino-3,5-dimethylphenyl)-1,4-diisopropylbenzene, and combinations thereof.

6. A curable composition according to claim 5, wherein said first epoxy resin component is selected from the group consisting of monomers and oligomers of $N,N,N^1,N^1$-tetraglycidyl diaminodiphenylmethane.

7. A curable composition according to claim 1, wherein said at least one curing agent comprises 4-4'-diaminodiphenylsulphone as a first curing agent, and said solid rubber comprises a solid acrylonitrile/butadiene/methacrylic acid rubber.

8. A curable composition according to claim 5, wherein said at least one curing agent further comprises dicyanodiamide as a second curing agent.

9. A curable composition according to claim 1, further comprising reinforcement fibers impregnated by said epoxy resin system.

10. A curable composition according to claim 9, wherein said reinforcement fibers comprise at least 20% by volume of the curable composition.

11. A curable composition according to claim 7, further comprising reinforcement fibers impregnated by said epoxy resin system.

12. A curable composition according to claim 11, wherein said reinforcement fibers comprise at least 20% by volume of the curable composition.

13. A curable composition according to claim 8, further comprising reinforcement fibers impregnated by said epoxy resin system.

14. A curable composition according to claim 13, wherein said reinforcement fibers comprise at least 20% by volume of the curable composition.

15. A prepreg comprising a curable composition according to claim 9.

16. A prepreg comprising a curable composition according to claim 10.

17. A prepreg comprising a curable composition according to claim 11.

18. A prepreg comprising a curable composition according to claim 12.

19. A prepreg comprising a curable composition according to claim 13.

20. A prepreg comprising a curable composition according to claim 14.

21. A process for making a curable composition according to claim 1 comprising forming a reaction mixture of said rubber, at least a proportion of said at least one first epoxy resin component, a catalyst capable of promoting a reaction between epoxy groups and the reactive groups of said rubber, and a polar solvent, wherein said rubber, said first epoxy resin component, and said catalyst comprise between 25 and 75 wt % of the reaction mixture, heating the reaction mixture to effect said reaction, cooling the resultant mixture to substantially ambient temperature and adding said second epoxy resin component, any remaining proportion of said first epoxy resin component, and said at least one curing agent to the resultant mixture and substantially removing the solvent therefrom.

22. A process according to claim 21 in which said rubber, said first epoxy resin component and said catalyst comprise between 35 and 65 wt % of the reaction mixture.

23. A process according to claim 21 in which said rubber, said first epoxy resin component and said catalyst comprise between 40 and 50 wt % of the reaction mixture.

24. A process according to claim 21 in which the mixture is heated to a temperature in the range 40° C. to 80° C., optionally under reflux.

25. A process according to claim 21 in which the catalyst is selected from the group consisting of alkyl triphenyl phosphonium iodide, bromide and chloride, wherein the alkyl is selected from the group consisting of methyl, ethyl, propyl, n-butyl, isobutyl, n-pentyl and n-decyl, triphenyl phosphine, stannous octoate, boron trifluoride.

26. A process according to claim 25 wherein the catalyst is ethyl triphenyl phosphonium iodide.

27. A process for making a curable composition according to claim 1 comprising forming a reaction mixture of said rubber, at least a proportion of said at least one first epoxy resin component, a catalyst capable of promoting a reaction between epoxy groups and the reactive groups of said rubber, and a polar solvent, wherein said rubber, said first epoxy resin component, and said catalyst comprise between 25 and 75 wt % of the reaction mixture, heating the reaction mixture to effect said reaction, adding to the reaction mixture said second epoxy resin component and any remaining proportion of said first epoxy resin component, cooling the resultant mixture to substantially ambient temperature, and adding said at least one curing agents to the resultant mixture and substantially removing the solvent therefrom.

* * * * *

UNITED STATES PATENT AND TRADEMARK OFFICE
CERTIFICATE OF CORRECTION

PATENT NO. : 6,013,730
DATED : January 11, 2000
INVENTOR(S) : PATRICK T. MCGRAIL ET AL.

It is certified that error appears in the above-identified patent and that said Letters Patent is hereby corrected as shown below:

COLUMN 3:

Line 33, "of" should be deleted.

COLUMN 7:

Line 13, "Theological" should read --rheological--.

COLUMN 9:

Line 50, "vaned" should read --varied--; and
　　　Line 51, "vaned" should read --varied--.

COLUMN 10:

EXAMPLE 2, "4,4'-diaminodiphenylsulfone" should read
　　　　　　--4,4'-diaminodiphenylsulfone ("DDS")-- and
　　　　　　"("DDS") Rubber" should read --Rubber-- and
　　　　　　"ioidide" should read --iodide--;
　　　Line 46, "vaned;" should read --varied--; and
　　　Line 56, "TABLE 1" should read --TABLE 2--.

COLUMN 11:

Line 1, "TABLE 1 - continued" should read
　　　　　　--TABLE 2 - continued--.

COLUMN 12:

TABLE 4, "749" should read --74.9-- and "754" should
　　　　　　read --75.4--.

UNITED STATES PATENT AND TRADEMARK OFFICE
CERTIFICATE OF CORRECTION

PATENT NO. : 6,013,730

DATED : January 11, 2000

INVENTOR(S) : PATRICK T. MCGRAIL ET AL.

It is certified that error appears in the above-identified patent and that said Letters Patent is hereby corrected as shown below:

COLUMN 14:

Line 14, "128.2 og," should read --128.20 g,--; and
Line 15, "mis" should read --g-- and "methylethyike-" should read --methylethylke---.

COLUMN 15:

Line 13, "flask" should read --flask was--;
Line 35, "40°" should read --50°--; and
Line 65, "dependant" should read --dependent--.

COLUMN 16:

Line 31, "were" should be deleted;
Line 40, "To" should read --Tg--;
Line 45, "Ream" should read --Beam--;
Line 56, "used for this test" should read --for this test that--; and
Line 57, "that" should read --and that--.

COLUMN 18:

Line 13, "was" should read --were--; and
Line 60, "an" should read --on--.

COLUMN 20:

TABLE 9, "FAiL" should read --FAIL--;
Line 52, "is" should be deleted; and
Line 53, "a" should read --consists essentially of a--.

UNITED STATES PATENT AND TRADEMARK OFFICE
CERTIFICATE OF CORRECTION

PATENT NO. : 6,013,730

DATED : January 11, 2000

INVENTOR(S) : PATRICK T. MCGRAIL ET AL.

Page 3 of 7

It is certified that error appears in the above-identified patent and that said Letters Patent is hereby corrected as shown below:

COLUMN 21:

Line 5, "second epoxy resin component is" should read --each of said at least one second epoxy resin component consists essentially of--;

Line 12, "said" should read --each of said at least one--;

Line 14, "after "diaminodiphenylmethane" insert --,N,N,N',N'-tetraglycidyl-bis-(4-aminophenyl)-1,4-diisopropyl benzene--;

Line 18, "said" should read --each of said at least one--;

Line 26, "claim 5," should read --claim 7,--; and

Line 27, "dicyanodia-" should read --dicyandia--.

COLUMN 22:

Line 21, "said" should read --said at least one--;

Line 24, "said" should read --said at least one--;

Line 30, "of" should read --of triphenyl phosphine, stannous octoate, boron trifluoride, boron trifluoride monoalkyl amine,--;

Line 31, "iodide, bromide, and" should read --alkyl triphenyl phosphonium bromide and alkyl triphenyl phosphonium--;

Line 33, "n-decyl, triphenyl" should read --n-decyl.--;

Line 34, line 34 should be deleted;

Line 49, "agents" should read --agent--; and

Line 50, insert

--28. A process according to claim 27 wherein the catalyst is ethyl triphenyl phosphonium iodide.

UNITED STATES PATENT AND TRADEMARK OFFICE
CERTIFICATE OF CORRECTION

PATENT NO. : 6,013,730

DATED : January 11, 2000

INVENTOR(S) : PATRICK T. MCGRAIL ET AL.

It is certified that error appears in the above-identified patent and that said Letters Patent is hereby corrected as shown below:

29. A curable composition according to claim 4 in which each of said at least one second epoxy resin component is selected from the group consisting of diglycidyl ethers of bisphenol A advanced with one mole of bisphenol A, triglycidyl ethers of 4-aminophenol, diglycidyl ether of bisphenol A, and diglycidyl 1,2-phthalate.

30. A curable composition according to claim 1 in which each of said at least one curing agent is an amino compound having a molecular weight up to 500 per amino group.

31. A curable composition according to claim 1 in which said at least one curing agent comprises a first curing agent capable of reacting with epoxy groups and of promoting reaction between hydroxyl groups and epoxy groups.

32. A curable composition according to claim 31 in which said first curing agent is selected from the group consisting of 3,3'- and 4,4'-diaminodiphenylsulphone, methylenedianiline, bis(4-amino-3,5-dimethylphenyl)-1,4-diisopropylbenzene and bis(4-aminophenyl)-1,4-diisopropylbenzene.

33. A curable composition according to claim 32 in which said at least one curing agent further comprises a second curing agent selected from the group consisting of dicyandiamide, 4-chlorophenyl-N,N-dimethyl-urea, 3,4-dichlorophenyl-N,N-dimethyl-urea and boron trifluoride monomethyl.

34. A curable composition according to claim 30 in which the total amine content of said at least one curing agent is in the range of 70-110% of the stoichiometric requirement of the epoxy resin components.

UNITED STATES PATENT AND TRADEMARK OFFICE
CERTIFICATE OF CORRECTION

PATENT NO. : 6,013,730

DATED : January 11, 2000

INVENTOR(S) : PATRICK T. MCGRAIL ET AL.

It is certified that error appears in the above-identified patent and that said Letters Patent is hereby corrected as shown below:

35. A curable composition according to claim 1 in which said rubber is soluble in said epoxy resin.

36. A curable composition according to claim 1 in which said rubber is selected from the group consisting of olefin, diene and nitrile rubbers and copolymers and terpolymers thereof which have pendant reactive groups.

37. A curable composition according to claim 36 in which said pendant reactive groups are carboxylic groups.

38. A curable composition according to claim 36 in which said rubber is a diene-nitrile copolymer having carboxylic groups.

39. A curable composition according to claim 1 in which said rubber is an acrylonitrile/butadiene rubber having carboxylic groups.

40. A curable composition according to claim 36 in which said pendant reactive groups are carboxylic groups and are provided by a methacrylic acid termonomer.

41. A curable composition according to claim 1 in which said rubber contains at least 1 wt % carboxylic groups.

42. A curable composition according to claim 1 in which said rubber contains at least 2 wt % carboxylic groups.

43. A curable composition according to claim 1 in which said rubber contains at least 2.5 wt % carboxylic groups.

UNITED STATES PATENT AND TRADEMARK OFFICE
CERTIFICATE OF CORRECTION

PATENT NO. : 6,013,730

DATED : January 11, 2000

INVENTOR(S) : PATRICK T. MCGRAIL ET AL.

It is certified that error appears in the above-identified patent and that said Letters Patent is hereby corrected as shown below:

44. A curable composition according to claim 1 in which said rubber contains up to 5 wt % carboxylic groups.

45. A curable composition according to claim 1 comprising 1 to 20 wt % of said rubber based on the total weight of said epoxy resin, said at least one curing agent and said reaction product.

46. A curable composition according to claim 1 comprising 1 to 10 wt % said rubber based on the total weight of said epoxy resin, said at least one curing agent and said reaction product.

47. A curable composition according to claim 1 comprising 3 to 6 wt % of said rubber base on the total weight of said epoxy resin, said at least one curing agent and said reaction product.

48. A curable composition according to claim 1 comprising 4.0 to 8.0 wt % of said rubber based on the total weight of said rubber and said at least one first epoxy resin component.

49. A curable composition according to claim 1 comprising 4.5 to 7.0 wt % of said rubber based on the total weight of said rubber and said first epoxy resin component.

50. A curable composition according to claim 1 in which the G' minimum thereof is with the range 20 Pa to 200 Pa as determined using a plate size of 40 mm, an initial temperature of 70°C, a final temperature of 170°C, a heating rate of 2.0°C/min, a strain rate of 10.0% and an oscillation of 10 rads/sec.

UNITED STATES PATENT AND TRADEMARK OFFICE
CERTIFICATE OF CORRECTION

PATENT NO.   : 6,013,730
DATED        : January 11, 2000
INVENTOR(S)  : PATRICK T. MCGRAIL ET AL.

It is certified that error appears in the above-identified patent and that said Letters Patent is hereby corrected as shown below:

51. A curable composition according to claim 50 in which said G' minimum is within the range 40 Pa to 160 Pa.

52. A curable composition according to claim 50 in which said G' minimum is within the range 80 Pa to 110 Pa.--

Signed and Sealed this

Twenty-ninth Day of May, 2001

Attest:

NICHOLAS P. GODICI

*Attesting Officer*   *Acting Director of the United States Patent and Trademark Office*